United States Patent
Bellezza

[19]

[11] Patent Number: 6,123,028
[45] Date of Patent: Sep. 26, 2000

[54] CONVEYOR FOR A LOAD-MOVING SYSTEM

[75] Inventor: Massimo Bellezza, Rivoli, Italy

[73] Assignee: CPM S.p.A., Italy

[21] Appl. No.: 09/091,970

[22] PCT Filed: Dec. 20, 1996

[86] PCT No.: PCT/IT96/00263

§ 371 Date: Sep. 24, 1998

§ 102(e) Date: Sep. 24, 1998

[87] PCT Pub. No.: WO97/24281

PCT Pub. Date: Jul. 10, 1997

[30] Foreign Application Priority Data

Dec. 29, 1995 [IT] Italy .................................. T095A1065

[51] Int. Cl.⁷ ..................................................... B61J 3/04
[52] U.S. Cl. .................. 104/172.3; 104/165; 198/345.1; 198/465.1
[58] Field of Search ................... 104/172.3, 35, 104/165; 198/345.1, 345.2, 345.3, 465.1, 465.2, 465.3, 867.14, 841, 834

[56] References Cited

U.S. PATENT DOCUMENTS

| | | | |
|---|---|---|---|
| 4,461,379 | 7/1984 | Papp | 198/472 |
| 4,492,297 | 1/1985 | Sticht | 198/345.1 |
| 4,502,585 | 3/1985 | Sticht | 198/345.1 |
| 4,552,260 | 11/1985 | Teagno et al. | 198/345.1 |
| 4,625,857 | 12/1986 | Kuehl | 198/465.1 |
| 4,696,236 | 9/1987 | Kanayama | 104/165 |
| 5,062,368 | 11/1991 | Sticht et al. | 104/172.3 |
| 5,213,195 | 5/1993 | Sticht | 198/465.2 |
| 5,217,103 | 6/1993 | Umlauf | 198/841 |
| 5,310,047 | 5/1994 | Ledingham | 198/841 |
| 5,529,168 | 6/1996 | Soriano et al. | 198/465.1 |
| 5,620,084 | 4/1997 | Mensch | 198/834 |
| 5,979,637 | 11/1999 | Iwamoto et al. | 198/465.1 |

FOREIGN PATENT DOCUMENTS

| | | |
|---|---|---|
| 0 115 357 | 8/1984 | European Pat. Off. . |
| 2 381 692 | 9/1978 | France . |
| 2 705 327 | 11/1994 | France . |
| 33 30 620 | 3/1985 | Germany . |

*Primary Examiner*—S. Joseph Morano
*Assistant Examiner*—Lars A. Olson
*Attorney, Agent, or Firm*—Leydig, Voit & Mayer, Ltd.

[57] ABSTRACT

The conveyor comprises a carriage (2) movable on four support wheels along the guides (3) of a support structure (4) guided by a further two directional wheels engaged in a track or channel between the guides; the carriage has a transmission shoe (45, 46) adapated to couple by friction with a belt (24) movable parallel to the guides; the guides may be arranged on the ground, resting on the floor, or may be suspended, supported by suitable frames, and are constructed as modular components (8) which can be interconnected in various ways to form straight horizontal courses with upward or downward slopes and curved paths; the belt (24) is tensioned between two pulleys (25, 26) located at the ends of each module (8), of which one is a drive pulley, being connected to its own electric motor mounted on the module itself; the carriage carries attachment members for transporting a pallet or for supporting a load; the belt (24) may be toothed as may also the transmission shoe (45, 46) to achieve a secure grip on the belt; particularly for long and heavy loads, the carriage is elongate and has two shoes at its ends.

13 Claims, 3 Drawing Sheets

CONVEYOR FOR A LOAD-MOVING SYSTEM

TECHNICAL FIELD

The present invention relates to a conveyor for a load moving system, comprising a carriage movable along the guides of a ground-based support structure, which rests on a floor, or of a support structure suspended from an overhead framework, and having connection means for connecting the carriage to a drive member located on the support structure so as to move the carriage along the guides.

BACKGROUND ART

Equipment for moving materials is known in the art which is made up from modular frames carrying a coplanar array of parallel, motor-driven rollers on which a pallet loaded with material to be transported, resting on the rollers, is conveyed along a predetermined course formed by a plurality of modules located adjacent each other, in end-to-end alignment.

Such equipment has considerable limitations in use as the roller frames are effective only for forming straight, horizontal courses; auxiliary equipment such as lifts, chutes and turntables are thus required for forming courses with changes in height or direction.

Other known conveyors are so-called "rolling-shutter" conveyors in which one or more endless roller chains which pass over two end pulleys are guided along a metal support structure having the shape, in plan, of the course to be travelled; flat support elements are connected to the chains and located adjacent each other so as to form a substantially continuous, articulated support bed like that defined by a rolling shutter for a window; the objects to be conveyed may be placed on this bed either directly or on pallets. These conveyors are very bulky, are very expensive to install and maintain, are not very reliable because of the long length of the drive chains, which is twice that of the course actually covered by the conveyor, which causes problems in maintaining the tension in the chains, of seizure of the rollers forming the chains and noise.

Similar problems are presented by ground-based conveyors in which the load is carried on platforms mounted on carriages driven along guides of a metal support structure by one or more motor-driven chains of the type previously described through rigid mechanical transmission devices, which may be deactivatable temporarily, for example to form accumulations.

Finally, overhead conveyor systems are known which are constituted by a suspended guide along which motor-driven carriages are movable, for example on wheels, and from which conveyor hooks are suspended; the carriages pick up control signals and power for their motors directly from conductive tracks (bus bars) carried by the guide through sliding shoes. Such systems are very efficient and silent but are suitable only for very clean working environments as, otherwise, the conductive tracks quickly become soiled by dust, grease, etc, causing loss of contact between the tracks and the shoes of the carriages with the possible loss of control and/or power at least along certain sections. Moreover, it is not possible to use such conveyors in inflammable environments since the rubbing of the shoes on the bus bars may cause sparks. Finally, these conveyors, if also used on long inclined courses (either rising or descending) are suitable only for limited loads since, beyond certain loads, the wheels may slide on the guides.

The aforedescribed drawbacks may be partly overcome by the conveyor system according to U.S. Pat. No. 5,062, 368. However, this reference relate to a conveyor system primarily adapted to be used solely on the ground and that, in any case, needs, to be operated effectively, to be built with a very high precision, specially as far as the guides and the engagement system of the pallet are concerned. This leads to very high production and maintenance costs. Moreover, this system is suitable for pallets of small dimension only and can displace the pallet along orthogonal directions only. Finally, at least as least far as the embodiments shown are concerned, it does not meet, nowadays, the governmental safety regulations.

DISCLOSURE OF INVENTION

The object of the invention is to provide a conveyor system which is free from the disadvantages described above and is still suitable for manufacture in the form of modules. Moreover it is also the object of the invention that the modules be usable equally well on the ground and for suspended structures.

The invention thus provides a conveyor for a load-moving system, comprising a support structure, at least one carriage movable along respective guides carried by the support structure, the carriage being adapted to support and convey a load, a transmission member carried by the support structure and extending parallel to the guides, connection means carried by the carriage and adapted to engage the transmission member to connect the carriage firmly to the transmission member, and motor means for activating the transmission member to move the carriage along the guides; and characterized as defined in claim 1.

More particularly, each transmission member is constituted by an endless belt which passes over two pulleys located at opposite ends of the respective module and one of which is motor-driven, while the connection means of each carriage are constituted by a pair of shoes engageable with one face of the belt arranged for this purpose and against which they are pressed by thrust means; the shoes being located at a mutual spacing, measured in the direction of advance of the belt greater than the maximum distance between the belts of two immediately adjacent modules of the conveyors

BRIEF DESCRIPTION OF THE DRAWINGS

These and other characteristics of the invention will become more apparent from the following description of one preferred embodiment thereof, given by way of non-limitative example, with reference to the appended drawings, in which.

BEST MODE FOR CARRYING OUT THE INVENTION

Figure 1:
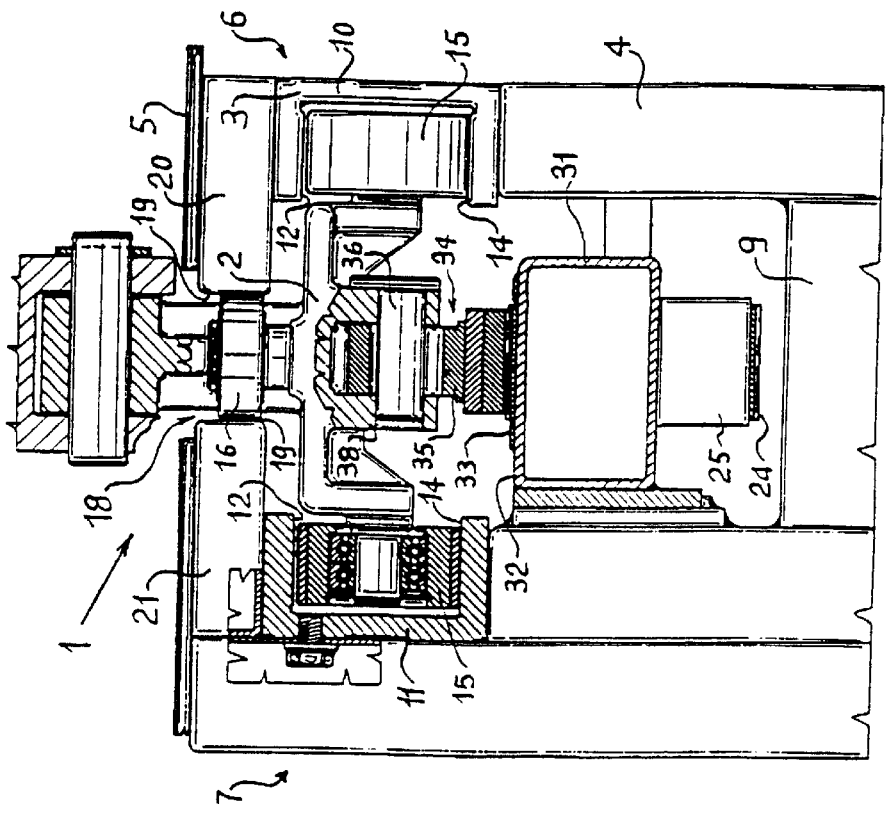
FIG. 1 is a partly-sectioned front-elevational view of the conveyor of the present invention.

With reference to FIG. 1, a conveyor is shown generally indicated 1 for effecting the transfer of any type of load along a course of any type and form. The conveyor 1 includes a carriage 2 movable along parallel guides 3 mounted on a self-supporting support structure 4 extending longitudinally in the direction of the guides 3; the support structure 4 illustrated may be located flush with the floor 5, for example set into a channel as shown in FIG. 1, or may simply rest on the floor or, if rotated through 180°, may be suspended from an overhead framework, not shown. For this purpose, the guides 3 are formed as two C-sections which are open towards each other so as to provide bilateral guiding (upwardly and downwardly) for the carriage 2.

Figure 3:
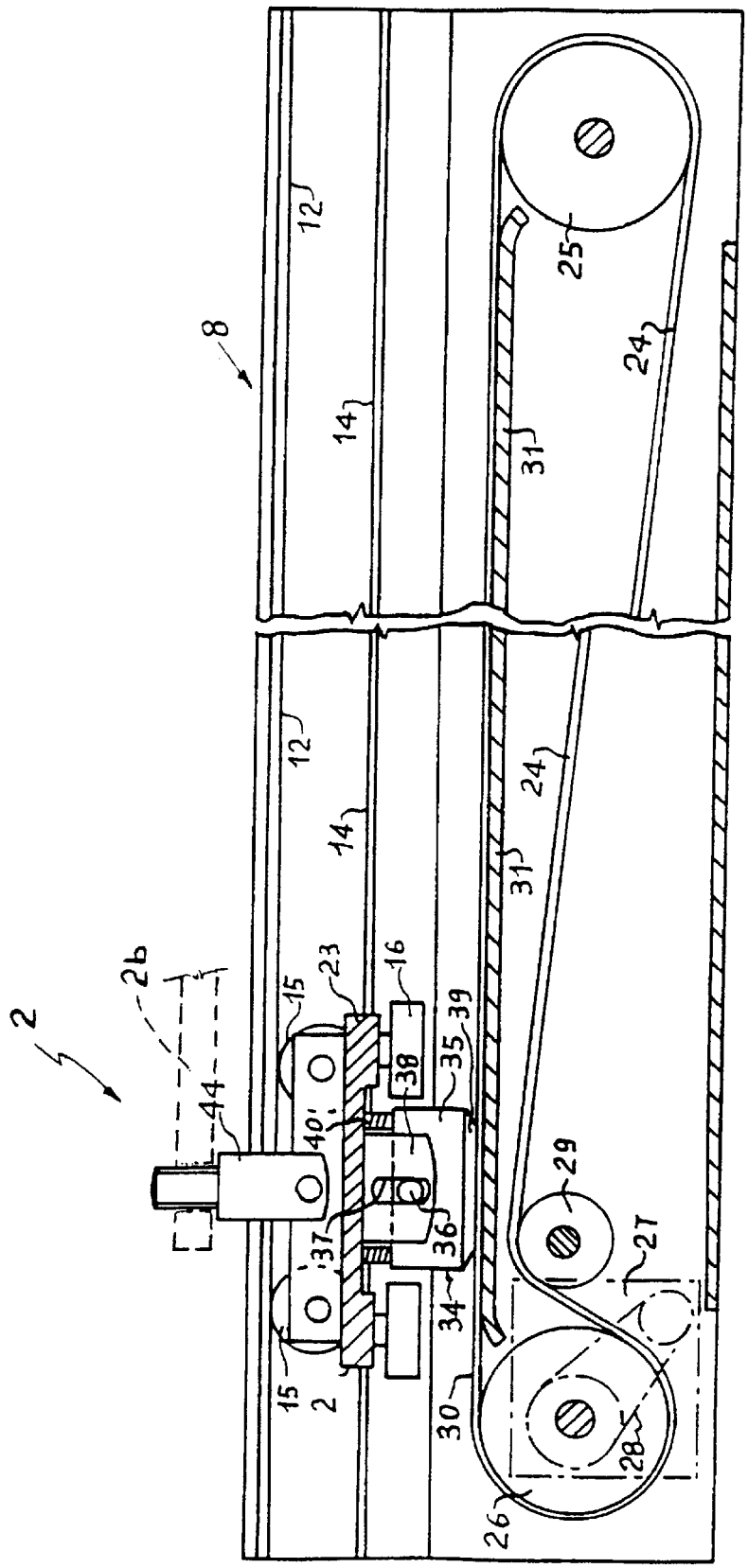
FIG. 3 is a side-elevational view of a support module for the conveyor of the invention.

The support structure 4 is constituted by a plurality of pairs of symmetrical parts 6 and 7 joined transversely so as to be mirror imaged by means of welded transverse spacer members 9 (FIG. 1), which also act as stiffening members, so as to form a plurality of modules 8 of predetermined length for guiding and supporting the carriage 2, one of which is illustrated completely in FIG. 3; the modules 8 can be connected in series with each other in adjacent, end-to-end positions to form the said predetermined course along which a series of carriages 2 may run to convey the said loads.

A particular application of the invention is to convey parts being worked along the production line of an industrial plant; for this purpose, the modules 8 may be linked in sequence in a straight horizontal line, possibly with rising and descending portions with a maximum slope of about 20° to the horizontal, or may be connected in a non-rectilinear arrangement with a minimum angle between two immediately adjacent modules 8 of about 15° or more.

More particularly, the parts 6 and 7 of each module 8 are metal structures made from steel sections (or of other material such as aluminium) welded and/or riveted together and the guides 3 are constituted by respective C-sections 10, 11 carried by the parts 6 and 7 respectively and each defining a pair of planar, parallel tracks 12 and 14 which face each other in a vertical direction.

Figure 2:
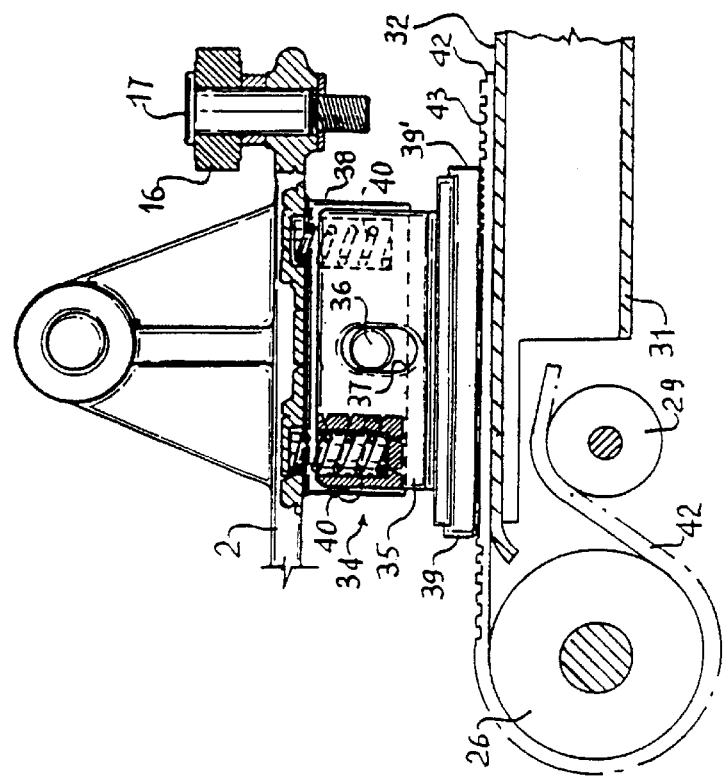
FIG. 2 is a partly-sectioned side-elevational view of the conveyor of FIG. 1.
Figure 4:
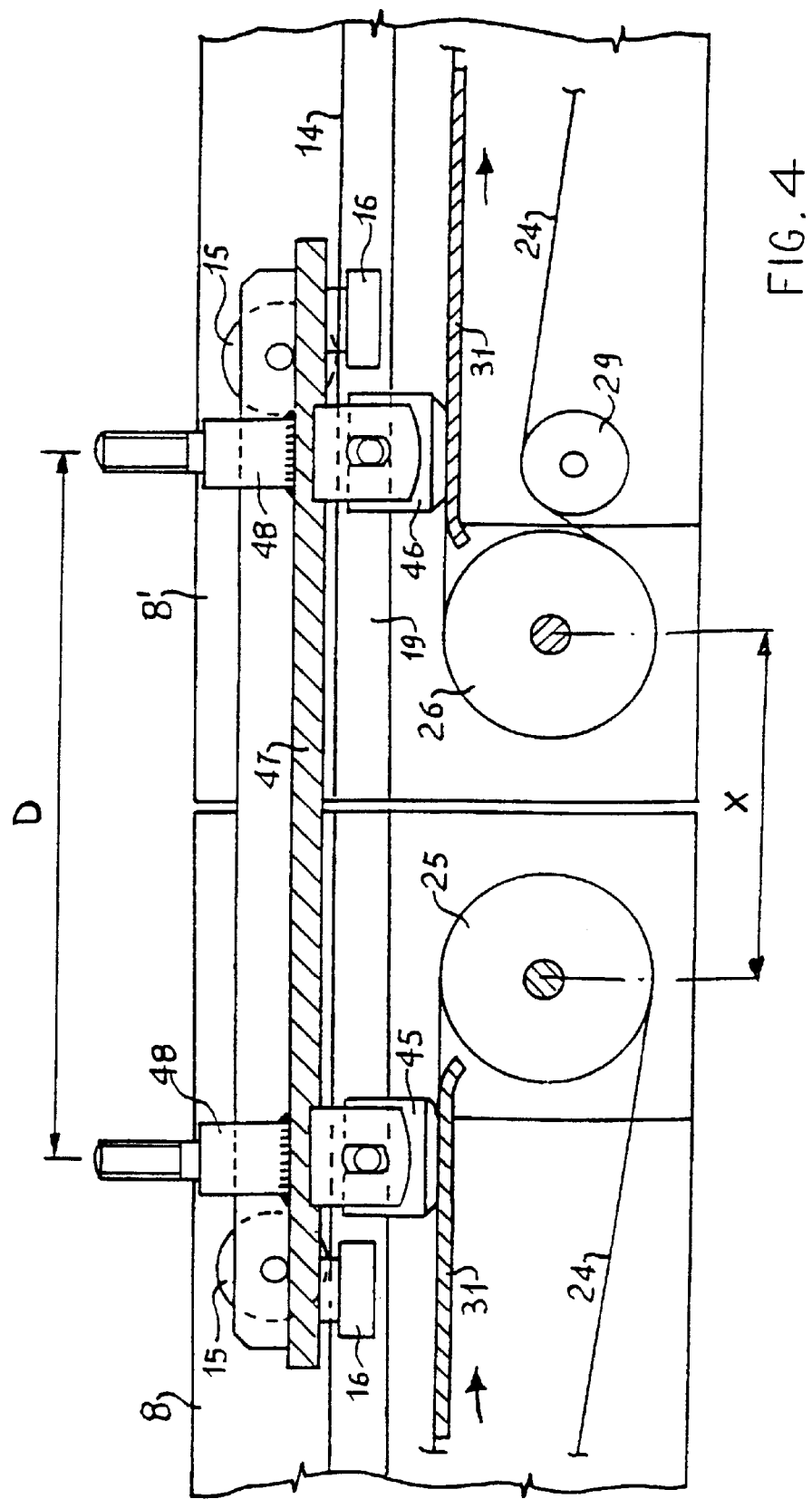
FIG. 4 shows the junction between two modules and an elongate carriage used on the conveyor of the invention.

The carriage 2 may run on the guides 10, 11 supported by one or two pairs of support wheels or rollers 15 manufactured from a special synthetic material with a high compressive strength and low noise when rolling; the support wheels 15 may run either on the lower tracks 14 or on the upper tracks 12. The carriage 2 also has one or two further guide wheels 16 which rotate on journals 17 with axes which are vertical or, at least, perpendicular to the axes of the support wheels 15; the guide wheels 16 are arranged in the longitudinal plane of symmetry of the carriage 2 and engage a central channel or track 18 defined by the outer, facing surfaces 19 of two profiled longitudinal sections 20 and 21 of the parts 6 and 7 respectively so as to guide the carriage 2 laterally; depending upon particular constructional requirements, the guide wheels 16 may be mounted on the upper face of the carriage 2 (FIGS. 1 and 2) or on the lower face, beneath the plane of the chassis 23 of the carriage 2 (FIGS. 3 and 4).

The module 8 houses a transmission member for transmitting drive to the carriage 2, this being constituted by an endless belt 24 (FIG. 3) which extends longitudinally between the two parts 6 and 7 of each module 8, passing over two pulleys 25 and 26 located at the ends of the module 8 and rotatable on shafts fixed to the two parts 6 and 7. The pulley 25 is idle while the pulley 26 is driven, being connected to a geared motor 27 of known type, not described in detail by means, for example, of a belt 28, the pulley 26 in turn driving the belt 24 to effect a predetermined rectilinear movement; in the embodiment shown purely by way of example, the belt 24 is kept tensioned between the pulleys 25, 26 by a take-up pulley 29 which ensures that the belt 24 is kept in firm contact with the drive pulley 26 over not less than about 250° to avoid slip. The belt 24 may also be tensioned by known tensioning systems on the wheel 25.

To provide the maximum flexibility in the formation of the course for the carriage 2, the geared motor 27 of each module 8 is controlled independently of the others by a central control unit, known per se and not visible in the drawings. The upper pass 30 of the belt 24 of each module 8 runs on a longitudinal support element 31 which is fixed to one (or both) of the parts 6, 7; the element 31 is constituted by a hollow profiled section with flat walls of which the upper, outer, slide face 32 (FIG. 1) is covered with a layer of low-friction material 33 to reduce friction between the belt and the support.

The carriage 2 is provided with mechanical connection means for connecting the carriage to the belt 24; in the embodiment shown in FIG. 3, the carriage 2 is constituted by the rigid interconnection of two identical carriages 2a (of which, for simplicity, only one is illustrated) spaced at a predetermined distance from each other by means of a longitudinal member 2b illustrated in broken outline. In this case, each carriage 2a has four wheels 15 and two guide wheels 16 and the connection means of each carriage 2a are constituted by a sliding shoe 34 located substantially equidistant from all four wheels 15.

The shoe 34 comprises a rigid body 35 pivoted on a pin 36 housed within a slot 37 of a fork 38 fixed to the carriage 2a and projecting from its lower part; the rigid body 35 has a sole plate 39 of synthetic material with a high coefficient of friction fixed thereto which, when urged into contact with the belt 24, can generate a transmission force sufficient to drive the carriage in the most onerous load conditions envisaged without danger of relative slip; the shoe 34 is connected to the carriage 2a by an articulated connection to allow the shoe itself to pivot and move vertically relative to the carriage 2 to a small extent to comply with any variation in the relative position of the carriage 2 and the belt 24 during the movement of the carriage.

To ensure that the carriage 2a is driven in any condition, the shoe 34 is pressed against the belt 24 by means of two helical springs 40 (or equivalent resilient systems) with a force sufficient to ensure that the shoe 34 is kept in close contact with the belt 24, without relative slip; the transmission of drive from the belt 24 to the carriage is always ensured, even when the carriage is empty and the biasing force of the springs 40 exceeds the weight of the carriage 2, or when the module 8 is inverted through 180°, that is when the carriage is turned upside-down, since this latter will then run along the upper track 12 of the guides 10, 11.

The articulated connection of the shoe 34 on the pin 36 allows it to rock in a vertical plane through an angle of about ±20° to the vertical to maintain contact with the belt 24, particularly when the carriage 2 enters a module 8 which is inclined upwardly or downwardly, or to facilitate the passage of the shoe across the junction between two consecutive modules; the slot 37 in turn allows the shoe 34 to slide vertically relative to the carriage by about 5 mm to allow the shoe to be separated from the belt 24 by means of a lifting device of known type, not shown in the drawings, either located on the ground at a station at which the carriage is to stop or on the carriage 2 itself.

To ensure that the shoe 34 maintains perfect contact with the belt 24 even in unfavourable circumstances, the belt is preferably constituted by a belt 42 (FIG. 2) with external teeth 43 while the sole plate 39 of the shoe 34 has complementary teeth adapted to mesh with the belt 42. As a further variation, the belt 42 may have teeth on both faces; in this case the pulleys 25 and 26 will also be toothed to eliminate any risk of the belt slipping.

Finally each carriage 2a has an engagement member 44 for connection to a load to be transported, for example a pallet carrying parts for working; this engagement member is constituted by a tow member (shown schematically in the drawings) pivoted on the upper part of the carriage 2a so as to project from the structure 4 and be capable of limited angular displacements to compensate for the inclination of the carriage on rising or descending portions of its course.

In the embodiment of FIG. 4 the carriage 2, on the contrary, is constituted by a single, rigid, elongate frame 47 provided at opposite longitudinal ends with two shoes 45 and 46 both of which are pivoted and identical to the shoe 34 just described and, on its opposite face, with a pair of non-pivoted spindles 48 which take the place of the pivoted members 44 and are welded so as to project vertically from the upper part of the frame 47 to receive the structure for carrying the load and fix it to the carriage itself.

According to the invention, in order to ensure the continuity of the drive to the carriage 2 as it moves from each module 8 to the identical module 8 immediately adjacent thereto, indicated 8' in FIG. 4, in both of the embodiments of FIGS. 3 and 4, it is necessary for the two shoes 45, 46 of any one carriage 2, or the two shoes 34 of each pair of carriages 2a connected rigidly together by the longitudinal member 2b to form a carriage 2 of predetermined length that can be adjusted at will according to the length of the longitudinal member 2b (which may also be telescopic), to be mutually spaced by a distance D (pitch) measured in the direction of advance of the belt 24 which is greater than the maximum distance (space) between the belts 24 of each pair of immediately adjacent modules 8, 8' and, preferably, greater than the interaxial spacing X between the centre of rotation of each pulley 25 of a module 8 and the opposite pulley 26 of the next module 8.

Thus, when the carriage 2 advances and is in transfer from one module 8 to the next (FIG. 4) the shoe closest to the module 8' (shoe 46) first leaves the belt 24 of the module 8 of origin and is suspended over the space between the two modules 8, 8'; the shoe 45, however, is still engaged with the belt 24 of the module of origin, and, as a result of the advancing movement of the respective belt 24, urges the carriage 2 to move in the direction of the arrow towards the module 8'; subsequently, the shoe 46 engages the belt 24 of the module 8' and the carriage 2 is located in the configuration illustrated in FIG. 4 in which its two shoes 45, 46 engage both the belts 24 of the two adjacent modules 8, 8' simultaneously; finally the shoe 45 leaves the module 8 of origin and the carriage 2, despite the shoe 45 being suspended over the space between the two modules 8, 8', continues its travel since, as a result of the advance of the belt 24 of the module 8' in the direction of the arrow, the shoe 46 already engaged with this belt 24, pulls the carriage towards the latter so as to complete the transfer to the module 8'.

What is claimed is:

1. A conveyor for a load-moving system, comprising:
   a support structure;
   at least one carriage movable along respective guides carried by the support structure, the carriage being adapted to support and convey a load;
   a transmission member carried by the support structure and extending parallel to the guides;
   connection means carried by the carriage and adapted to engage the transmission member to connect the carriage firmly to the transmission member; and
   a motor for activating the transmission member to move the carriage along the guides;
   wherein the support structure is constituted by a plurality of mutually-independent, rectilinear modules juxtaposed end-to-end to form a predetermined course, each module having its own motor independent of those of the other modules; and
   the connection means is such that, when the carriage passes from a first module to a second module immediately adjacent thereto, the connection means are always engaged with the transmission member of at least one of the two adjacent modules, and the connection means of each carriage is constituted by at least a pair of shoes engageable with the transmission member the shoes being spaced apart by a distance (D), measured in the direction of advance of the transmission member, greater than the maximum distance between two immediately adjacent modules of the conveyor, each shoe being constituted by a rigid body integrally provided with a friction element adapted to cooperate with the transmission member so as to be fixed thereto, the friction element being constituted by a sole plate rigidly connected to the rigid body, each shoe being connected to the carriage by an articulated connection to allow the rigid body to pivot and move vertically relative to the carriage and the transmission member during the movement of the carriage, in such a way to enable the angular position of the shoe to be varied and to allow the shoe to be displaced in relation to the transmission member, and each shoe being kept engaged with the transmission member by a spring system interposed between the rigid body of the respective shoe and the carriage to keep the friction element pressed against the transmission member.

2. The conveyor of claim 1, wherein each transmission member is constituted by an endless belt which passes over two pulleys at opposite ends of the respective module, one of which pulleys is motor driven, and the shoes are engageable with one face of the belt arranged for this purpose and against which they are pressed by the spring system.

3. The conveyor of claim 2, wherein each friction element is adapted to cooperate with the belt.

4. The conveyor of claim 2, wherein the spring system is interposed between the shoe and the carriage to keep the shoe pressed against the belt.

5. The conveyor of claim 2, wherein the articulated connection allows the shoe to be displaced linearly in a direction perpendicular to the belt.

6. The conveyor of claim 2, wherein the belt is constituted by a belt with teeth on its face facing the shoe and the shoe includes a toothed clutch member adapted to mesh with the teeth of the belt.

7. The conveyor of claim 2, wherein the belt runs on a longitudinal support element carried by each module and extending between the pulleys.

8. The conveyor of claim 7, wherein the support element has a flat face facing the belt which is coated with a layer of low-friction material, the face being in sliding contact with the belt.

9. The conveyor of claim 1, wherein the carriage includes at least two pairs of support wheels rotatable about parallel axes for moving the carriage along the guides and at least one further wheel for guiding the carriage laterally along the guides.

10. The conveyor of claim 9, wherein the guides are constituted by a pair of C-sections facing each other and each defining a planar upper track and a parallel lower track; the support wheels being able to run either on the lower or on the upper track.

11. The conveyor of claim 9, wherein the further wheel rotates about an axis perpendicular to the axes of the support wheels.

12. The conveyor of claim 1, wherein the carriage includes at least one engagement member adapted to tow the load along the guides.

13. The conveyor of claim 12, wherein the engagement member is a draw member pivoted on the carriage.

* * * * *